United States Patent Office 3,637,876
Patented Jan. 25, 1972

3,637,876
METHOD OF PRODUCING ALKYLADAMANTANES
Evgeny Ignatievich Bagry, Ulitsa Nagatinskaya 38, kv. 8, and Pafnuty Ivanovich Sanin, Ulitsa Dm. Ulyanova 3, kv. 116, both of Moscow, U.S.S.R.
No Drawing. Filed Mar. 18, 1970, Ser. No. 20,805
Int. Cl. C07c 5/24
U.S. Cl. 260—666 M
6 Claims

ABSTRACT OF THE DISCLOSURE

The present invention relates to methods of production of alkyladamantanes.

The method according to the invention consists in isomerization of tricyclic saturated condensed hydrocarbons at a temperature of 180–320° C. in the presence of aluminium oxide or silicon oxide treated with a mineral acid or in the presence of natural or synthetic aluminium silicates.

The alkyladamantanes are used in the field of petrochemical synthesis, in production of pharmaceutical preparations and as a thermally stable hydrocarbon fuel.

---

The present invention relates to a method of producing alkyladamantane, which, according to the literature data, is a promising compound for utilization in the process of petrochemical synthesis, as a starting material for producing pharmaceutical preparations and as a thermally stable hydrocarbon fuel. However, the use of alkyladamantanes for the above purposes is limited due to the fact that they are not readily available, which fact is basically accounted for by the absence of simple methods of their synthesis.

It is known that the homologues of adamantane having a composition $C_{12}$–$C_{14}$ can be obtained by means of isomerization of certain condensed tricyclic perhydroaromatic hydrocarbons (perhydroacenaphthene, perhydrofluorene, etc.) over a catalyst based on aluminium bromide or aluminium chloride and hydrogen chloride or hydrogen bromide (A. Scheider, B. W. Warren and E. Janosky, J. Org. Chem. 31, No. 5, 1617, 1966, U.S. Pat. No. 3,128,316).

The reaction is carried out preferably at a temperature of 25–27° C. for several hours, while shaking the vessel with the starting hydrocarbons and catalyst in the form of an oily liquid prepared by passing hydrogen bromide through a solution of aluminium bromide in dimethylhexane.

The known method is disadvantageous in the complexity of the process to be effected, owing to the fact that the reaction is conducted in the interface of two liquid phases and also due to the fact that the employed catalyst is extremely vigorous, unstable (it is decomposed in the air) and inconvenient to handle and this requires special equipment and presents a severe problem in effecting the process on an industrial scale.

An object of the present invention is to provide a simplified catalytic method of producing alkyladamantanes so as to provide a base for their production on an industrial scale.

Another object of the invention is to find out a catalyst which would be convenient in handling, stable in the process and would not exert an aggressive action upon the equipment.

These objects have been attained by contacting tricyclic saturated condensed hydrocarbons, containing more than 10 carbon atoms, with a catalyst. According to the invention, the said hydrocarbons are contacted with solid catalysts consisting of oxides of the elements of the III and IV groups of the Periodic System, preferably silicon and aluminium oxides treated with mineral acids or with catalysts consisting of natural or synthetic aluminium silicates.

The oxides of the above-mentioned elements are preferably composed of aluminium oxide treated with a sulphuric acid due to low cost and availability of the components and due to a high activity of this catalyst. The treatment of the aluminium oxide with sulphuric acid is carried out by impregnating the precalcined aluminium oxide with a 5–15% sulphuric acid during 24 hours. After that the catalyst is dried at a temperature of about 130° C., then it is dried in a nitrogen flow at 300–320° C. Hydrofluoric acid can be used instead of sulphuric acid.

The aluminium silicates are preferably used which have the following composition in percent by weight: 12 $Al_2O_3$, 75.2 $SiO_2$, 8.0 $H_2O$, the rest being admixtures of MgO, $Na_2O$, CaO as these components are inexpensive, easily available and feature a high mechanical strength. The aluminium silicates may be used without additional treatment with mineral acids.

The process of contacting said tricyclic hydrocarbons with said catalysts should be effected at a temperature of 180 to 320° C., and preferably at 200 to 250° C., because at such a temperature the reaction rate is sufficiently high, while destruction of the hydrocarbons is insignificant. By maintaining this temperature and the volume ratio of the catalyst to the starting hydrocarbon not less than 10:1 and the volume velocity of passing the raw material at least 0.1 hour$^{-1}$, it is possible to obtain full conversion of the starting hydrocarbons during one cycle and the yield of the target products equal to 50–85% depending on the starting hydrocarbon taken.

The condensed tricyclic hydrocarbons may be composed of perhydroacenaphthene, perhydrofluorene, perhydroanthracene, perhydrophenanthrene, as well as their alkyl-derivatives and other hydrocarbons of this type. The above compounds can be used both separately and in mixtures.

The proposed method can be carried into effect both in periodic-action and continuous systems with a stationary or movable layer of catalyst, in the atmosphere of air, inert gases or hydrogen. The starting hydrocarbon may be introduced into the reactor in the pure state or in a solution for example in a solution of cyclohexane, -n- hexane, in a liquid phase or in a vapour phase, at an atmospheric, reduced or elevated pressure.

As is seen from the description of the invention, the proposed method is simple in realization, does not require special equipment. The catalyst is easily available, is inexpensive and does not exert a violent effect on the equipment and is convenient in handling due to the fact that it is in a solid state. The catalyst can easily be recovered by calcining it in an air flow at a temperature of 550–600° C.

The proposed method makes it possible to use the products and waste materials of coking plants containing condensed aromatic polycyclic hydrocarbons which, when hydrated, are used for production of alkyladamantanes which are valuable compounds. Following is a description by way of example of the method of carrying the invention into effect.

EXAMPLE 1

The starting substance for isomerization is perhydroacenaphthene. 3 cm.$^3$ hydrocarbon is passed over 50 cm.$^3$ of catalyst composed of aluminum oxide treated with sulphuric acid in a weak flow of nitrogen at 210° C. during 40 min. (the volume velocity 0.1 hour$^{-1}$). 2.6 cm.$^3$ of catalyst (the yield is 87% by volume) comprising 46% of 1,3-dimethyladamantane, 14% of 1-ethyladamantane and 36% of 1,4-dimethyladamantane, 1,2-dimethyl- and 2-ethyladamantane. The perhydroacenaphthene is completely converted into homologues of adamantane. If 2.5 cm.$^3$ of the obtained catalysate is passed twice repeatedly under the similar conditions (each time above the recovered catalyst), 1.6 cm.$^3$ of catalysate is obtained having the following composition: 1,3 - dimethyladamantane 84%, 1-ethyladamantane 6%, the other isomers amounting to 8%. The index of refraction of the catalysate $n_D^{20}$ 1.4805.

According to the literature data, the index of refraction for 1,3-dimethyladamantane is $n_D^{20}$ 1.4768.

The composition of the catalysts was determined by the method of gas-liquid chromatography, standard compounds being used for identification. The catalyst used was composed of aluminum oxide activated with sulphuric acid by employing the following method. Pure aluminium oxide was calcined during the 3 hours at 550° C., was held during 24 hours in 10% sulphuric acid and was dried first at 130° C. and then in a nitrogen flow at 300–320° C. The bulk weight of the catalyst is 0.6 g./cm.$^3$. The catalyst was recovered by calcining it in an air flow at 550–600° C.

EXAMPLE 2

The starting hydrocarbon was composed of perhydrofluorene. The reaction was conducted under the same conditions as in Example 1. The catalysate obtained after 3-fold passage at a yield equal to 50%, when evaluating in the starting hydrocarbon, contained 50% of 1,3,5-trimethyladamantane, 27% of 1-ethyl-3-methyladamantane and 20% of other isomeric alkyladamantanes having the composition $C_{13}H_{22}$.

EXAMPLE 3

3 cm.$^3$ of perhydrofluorene was passed over 60 cm.$^3$ of catalyst according to Example 1, twice successively at 190° C. during 40 minutes. 1.8 m.$^3$ of catalysate is obtained which contains 5% of 1,3,5-trimethyladamantane, 10% of 1-ethyl-3-methyladamantane, 55% of perhydrophenalene and 30% of the starting hydrocarbon.

EXAMPLE 4

8 cm.$^3$ of saturated solution of perhydroanthracene in cyclohexane was passed three times at 210° C. over 60 cm.$^3$ of catalyst of the composition given in Example 1 during 45 minutes. The catalyst contained 10% of 1,3,5,7-tetraethyladamantane and 38% of 1-ethyl-3,5-dimethyladamantane when calculated for sum of alkyladamantanes having the composition $C_{14}H_{24}$.

EXAMPLE 5

The aluminum silicate catalyst having the composition: 12.1 wt. % of $Al_2O_3$, 75.2 wt. % of $SiO_2$, 8.0 wt. % of $H_2O$, the rest being composed of admixture containing MgO, CaO, $Na_2O$ was calcinated during 1 hour in a nitrogen flow at 300° C. 3 cm.$^3$ of perhydroacenaphthene was passed twice successively over 60 cm.$^3$ of catalyst at 250° C. during 40 minutes in a weak nitrogen flow. 2 cm.$^3$ of catalyst was obtained containing 15% of 1,3-dimethyladamantane and 15% of 1-ethyladamantane, 60% of other alkyladamantanes of the composition $C_{12}H_{20}$ and 10% of the product of destruction.

The application of the proposed method is not limited by the examples given hereinabove. Other tricyclic saturated hydrocarbons of the above type may also be used as a stock for production of alkyladamantanes according to the proposed method. The above method is suitable for production both of mixtures of alkyladamantanes of the given molecular mass and for production of individual very stable isomers if a sufficient time of contact is provided. The method is also suitable for production of intermediate compounds, for example perhydrophenalenes.

We claim:

1. A method of producing $C_{12}$-$C_{14}$ alkyladamantanes which comprises contacting $C_{12}$-$C_{14}$ tricyclic saturated condensed hydrocarbons at a temperature of 180° to 320° C. with a solid catalyst selected from the group consisting of aluminum silicate, and aluminum oxide impregnated with sulfuric acid.

2. The method of claim 1 wherein the process is conducted at a temperature of 200° to 250° C.

3. The method of claim 1 wherein the catalyst-to-tricyclic saturated condensed hydrocarbon volume ratio equals 10:1.

4. A method of producing $C_{12}$-$C_{14}$ alkyladamantanes which comprises contacting tricyclic saturated condensed hydrocarbons selected from the group consisting of perhydroacenaphthene, perhydrofluorene, perhydroanthracene, and perhydrophenanthrene at a temperature of 180° to 320° C. with a solid catalyst selected from the group consisting of aluminum silicate, and aluminum oxide impregnated with sulfuric acid.

5. The method of claim 4 wherein the process is conducted at a temperature of 200° to 250° C.

6. The method of claim 4 wherein the catalyst-to-tricyclic saturated condensed hydrocarbon volume ratio equals 10:1.

References Cited

Chem. Abstracts 57, 4938a (1962), abstract of A. F. Plate et al., article from *Neffekhimiyc* 1, 599–603, 1961.

Raymond C. Fort, Jr., et al.: Chem. Rev., vol. 64, p. 280, 1964.

DELBERT E. GANTZ, Primary Examiner

V. O'KEEFE, Assistant Examiner